July 28, 1942. A. R. GOLDSBY ET AL Re. 22,146
ALKYLATION OF HYDROCARBONS
Original Filed April 20, 1940
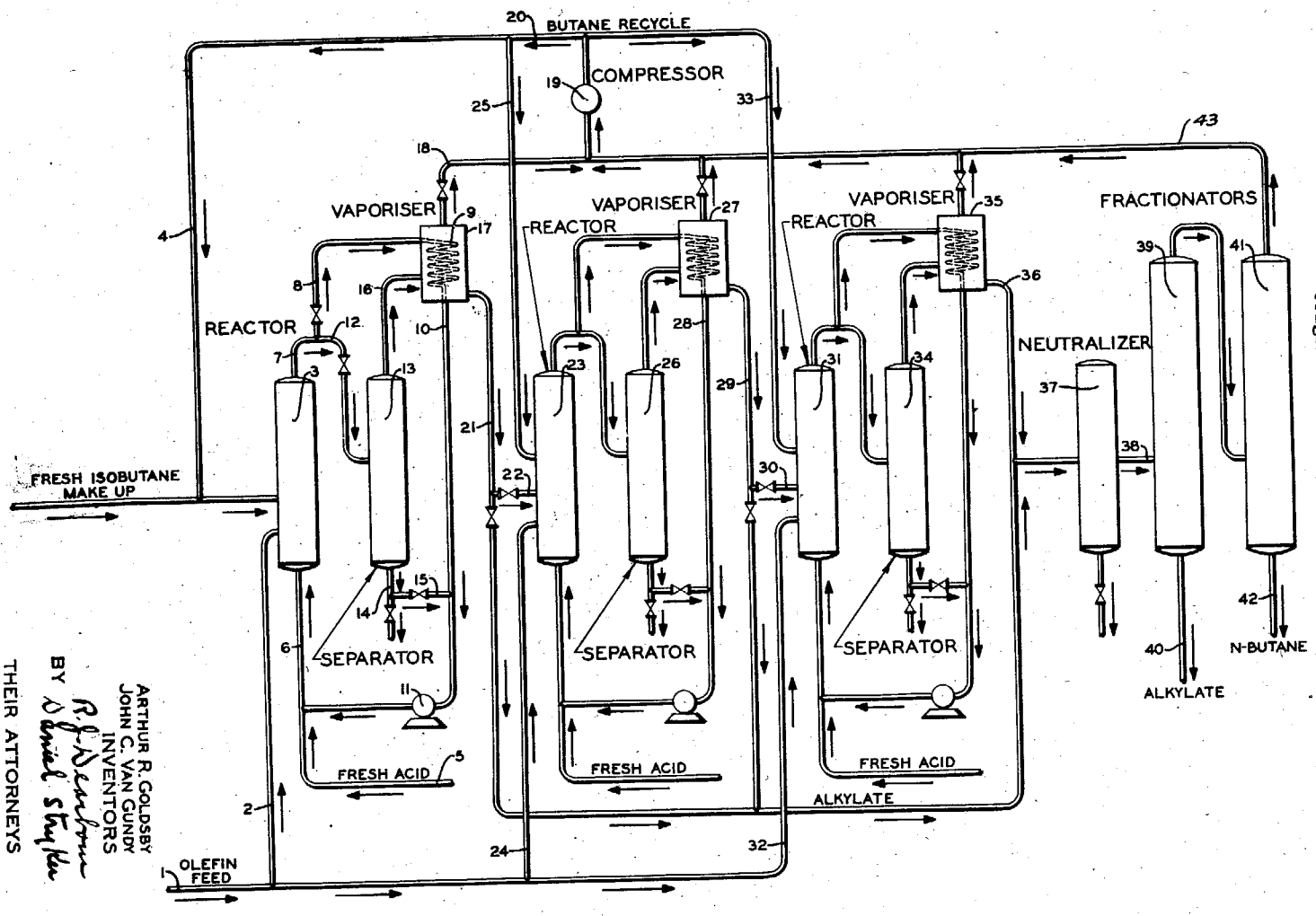
ARTHUR R. GOLDSBY
JOHN C. VAN GUNDY
INVENTORS
BY R. J. Dearborn
Daniel Stryker
THEIR ATTORNEYS Reissued July 28, 1942

Re. 22,146

UNITED STATES PATENT OFFICE 22,146

ALKYLATION OF HYDROCARBONS

Arthur R. Goldsby and John C. Van Gundy, Beacon, N. Y., assignors, by mesne assignments, to The Texas Company, New York, N. Y., a corporation of Delaware Original No. 2,256,880, dated September 23, 1941, Serial No. 330,658, April 20, 1940. Application for reissue October 16, 1941, Serial No. 415,331

13 Claims. (Cl. 196—10)

This invention relates to the alkylation of isoparaffin hydrocarbons with olefin hydrocarbons in the presence of an alkylation catalyst, such as concentrated sulphuric acid. It has particular application to the manufacture of high antiknock gasoline hydrocarbons suitable for use in the production of motor fuel.

Broadly, the invention contemplates effecting the alkylation reaction in a series of reaction stages in a continuous manner and subjecting the hydrocarbon mixture flowing from a preceding to a succeeding stage to cooling to remove exothermic heat of reaction, and also removing from this hydrocarbon mixture, prior to its introduction to the succeeding stage, at least a substantial portion of the alkylation products, as well as a substantial amount of normal paraffinic hydrocarbons that may be associated with the alkylated hydrocarbons.

Alkylation of olefin hydrocarbons with isoparaffin hydrocarbons by contact with a catalyst, such as concentrated sulphuric acid, is accompanied by considerable evolution of heat. It is desirable, however, from the standpoint of realizing high yields and long catalyst life, to maintain the reaction temperature within certain limits. Also, in order to achieve these objects, it has been found desirable to avoid the accumulation of alkylation products as well as normal paraffin hydrocarbons in the reaction zone. Therefore, the process of the present invention has for its purpose the obtaining of the advantages which accrue as a result of continuously removing from the reaction those materials which are detrimental to the reaction, and also the benefit accruing from cooling the reaction mixture between stages.

In accordance with the present invention a hydrocarbon feed containing isoparaffins and olefins is continuously passed to a series of reaction vessels, in each of which the hydrocarbons are brought into intimate contact with a liquid catalyst to produce alkylated hydrocarbons with evolution of heat. A portion of the reacting materials is withdrawn from a preceding stage and, at least in part, passed to a succeeding stage. Low boiling hydrocarbons are evaporated with refrigerative effect from a portion of the withdrawn mixture such that it is cooled and heat interchange is effected between the vaporizing or cooled mixture and reacting hydrocarbons and catalyst so as to absorb liberated heat of reaction.

Where the feed to the system comprises normally gaseous hydrocarbons, including isobutane and normal butane, the above-mentioned vaporized hydrocarbon will comprise butanes and these vaporized hydrocarbons are returned to the system, either to a preceding stage or to a succeeding stage, or both, as may be desired.

Unvaporized hydrocarbons, comprising alkylated hydrocarbons and some normal paraffins, are removed, at least in part, from the system, the portions not so removed being returned to a succeeding reaction stage in the operation.

Provision is made for separating used catalyst from the withdrawn mixture between stages and recycling it, all or in part, to the preceding reaction stage, or, if desired, passing it to a succeeding stage.

Advantageously, provision is made for withdrawing a stream of reacting hydrocarbons and catalyst from each reaction stage, and returning it to the same stage in sufficient amount to provide adequate agitation within the reaction vessel. This circulating stream of reacting materials can be brought into indirect heat exchange with the portion of the withdrawn mixture undergoing vaporization with refrigerative effect. In this way the circulating stream is cooled prior to its return to the reaction vessel, thereby absorbing the liberated heat of reaction.

In order to describe the invention more fully reference will now be made to the figure of the accompanying drawing illustrating one method of flow.

Referring to the figure: A hydrocarbon fraction comprising $C_4$ olefins and paraffins from a source not shown, is passed through a pipe 1 communicating with a branch pipe 2 leading to a reaction vessel 3. Isobutane, in addition to that contained in the feed, is introduced to the reaction vessel 3 from a pipe 4, and to which reference will be made later.

In the reaction vessel 3 the isobutane is subjected to reaction with the olefin hydrocarbons by contact with an alkylation catalyst, advantageously concentrated sulfuric acid. The fresh acid is introduced from a source not shown through a pipe 5 connecting with a circulating pipe 6, which communicates with the lower portion of the vessel 3, as indicated.

The reaction mixture continuously overflows from the top of the vessel through a pipe 7. A portion of the overflow is passed through a branch pipe 8 and a cooling coil 9. The cooled mixture passes from the coil 9 through a pipe 10, being forced by a circulating pump 11 through the previously mentioned pipe 6 back to the reaction vessel 3.

That portion of the overflow not passing through pipe 8 passes through a branch pipe 12 to a separator 13 wherein it separates into phases, namely, a catalyst phase and a hydrocarbon phase. The catalyst phase is withdrawn through a pipe 14 and all or in part passed through branch pipe 15 to the previously mentioned pipe 10 for return to the reaction vessel 3. The portion not so returned may be withdrawn from the system.

The hydrocarbon phase accumulating in the upper portion of the separator 13 is passed through a pipe 16 to a vaporizing vessel 17, in the interior of which is placed the previously mentioned cooling coil 9.

The pressure in the vaporizer 17 is maintained sufficiently low to cause vaporization of the lower boiling hydrocarbons, such as isobutane and normal butane. Vaporization of these hydrocarbons causes a reduction in temperature of the unvaporized material surrounding the coil 9 so that the mixture flowing through the interior of the coil is cooled. The amount of vaporization is controlled so as to produce the desired amount of cooling. The vaporized hydrocarbons are removed through a pipe 18 leading to a compressor 19, by which means they are compressed and discharged into a pipe 20, which, in turn, communicates with the previously mentioned pipe 4.

The unvaporized hydrocarbons accumulating in the vaporizer 17 are drawn off through a pipe 21. The withdrawn hydrocarbons may be passed, all or in part, through a branch pipe 22 to a next succeeding reaction vessel 23. The portion not so introduced to the reaction vessel 23 is drawn off from the reaction zone and passed to a neutralizing vessel to which reference will be made later.

The operation of the reaction vessel 23 is similar to that described for the reaction vessel 3. Fresh olefin feed is introduced from the pipe 1 and branch pipe 24 while isobutane is introduced through a pipe 25.

The reaction mixture is similarly drawn off and passed in part to a separator 26 and in part to a vaporizer 27. Provision is made for drawing off the catalyst layer from the separator 26 and recycling it, all or in part, together with fresh make-up acid, to the reaction vessel 23. Provision is also made for vaporizing the required amount of low boiling hydrocarbons in the vaporizer 27 so as to supply the desired amount of cooling to the reaction mixture flowing through the cooling coil located within the vaporizer. The cooled circulating mixture is returned to the reaction vessel through a circulating line 28.

The unvaporized hydrocarbons from the vaporizer 27 are drawn off through a pipe 29, the desired portion thereof being passed through a branch pipe 30 to a succeeding reaction vessel 31. The portion not entering the reaction vessel 31 is drawn off and passed to the neutralizing vessel.

Likewise, fresh olefin feed is introduced to the reactor 31 from pipe 1 and branch pipe 32, while isobutane is introduced through pipe 33.

Again, the overflow from the reactor 31 is passed in part to a separator 34 and in part to a vaporizer 35. The unvaporized hydrocarbons from the vaporizer 35 are drawn off through a pipe 36 to a neutralizer 37, which has already been mentioned, and which receives the unvaporized hydrocarbons from the two preceding stages.

These unvaporized hydrocarbons comprise alkylated hydrocarbons containing a small amount of acid. This retained acid is removed in the neutralizing vessel 37 by treatment with an alkaline wash.

The neutralized product is then passed through a pipe 38 to a fractionator 39 for the purpose of stabilizing the alkylated hydrocarbons. The stabilized product is removed through a pipe 40, while the low boiling hydrocarbons, comprising butanes, are passed to a succeeding fractionator 41 to effect separation between iso and normal butane. The normal butane is drawn off through a pipe 42, while the isobutane is passed through a pipe 43 communicating with the pipe 18 previously mentioned and by which means it may be returned to the system.

In describing the method of flow, reference has been made to a hydrocarbon feed comprising $C_4$ olefins and paraffins. It is contemplated, however, that the process is applicable to the treatment of hydrocarbons of either lower or higher molecular weight. Where the feed contains $C_3$ hydrocarbons, it may be desirable to remove propane prior to introduction to the reaction vessels.

Where it is desired to eliminate propane, it may be desirable to separate the feed initially into a fraction containing $C_3$ and lighter hydrocarbons and a fraction containing $C_4$ and heavier hydrocarbons. The $C_3$ fraction containing propane is then passed through an absorption tower wherein it is brought into contact with used or partially spent catalyst so as to selectively absorb the $C_3$ olefin from the mixture. The unabsorbed hydrocarbons comprising propane are discharged, while the acid and absorbed $C_3$ olefin is passed to the alkylation stages wherein it undergoes reaction together with the $C_4$ and heavier hydrocarbons.

The feed hydrocarbons may be introduced in parallel to each of the reaction stages, as described above, or may be passed in series through the reaction stages.

Where concentrated sulfuric acid is employed as the catalyst, it is desirable to employ a concentration within the range about 90 to 100%, and preferably around 96 to 100% $H_2SO_4$. The amount of fresh acid added may be about 1/5 to 1/20, or less, of the volume of the total liquid alkylate produced. The proportion of catalyst is such as to provide between about .5 and 1.5 parts of acid to one part by volume of the total hydrocarbons in the reaction mixture. The temperature of reaction ranges from around 30 to 100° F. and, preferably, is around 30 to 60° F.

It is desirable to maintain the ratio of isoparaffin to olefins at least 1:1 and, preferably, between about 3:1 and 5:1.

While concentrated sulfuric acid has been mentioned as a catalyst, it is to be understood that the invention is also applicable with other fluid catalysts, such as aluminum chloride or aluminum bromide, suspended or dispersed in an aluminum halide-hydrocarbon complex. Another suitable catalyst may comprise a boron trifluoride-water complex having the formula $BF_3.nH_2O$, where $n$ has a value ranging from about 1 to 1.5.

Instead of employing separate separating and vaporizing vessels, as illustrated in the drawing, it is contemplated that a single vessel may be employed with provision for effecting simultaneous phase separation and vaporization of the lower boiling hydrocarbons with refrigerative effect. For example, a vertical separating vessel with ample space in which to effect vaporization may be used. In such case, the vaporizing space could be provided with baffling to knock back higher boiling hydrocarbons that might otherwise be entrained in the vapors.

In such a separator there would be found three phases, namely, a normally gaseous hydrocarbon phase comprising the vaporized butanes, a normally liquid hydrocarbon phase comprising alkylated hydrocarbons, and a catalyst phase comprising a catalyst. A suitable proportion of the overflow from the reaction vessels would pass to the separators, while the remainder would be recycled directly to the reaction vessels to provide the necessary agitation. Thus, the operation would be essentially the same as that already illustrated in the drawing.

Obviously many modifications and variations of the invention, as hereinbefore set forth, may be made without departing from the spirit and scope thereof, and therefore only such limitations should be imposed as are indicated in the appended claims.

We claim:

1. In a continuous process for alkylating isoparaffin hydrocarbons with olefin hydrocarbons by contact with a liquid alkylation catalyst, the steps comprising continuously passing a hydrocarbon feed containing isobutane, normal butane and olefins to a series of reaction stages wherein the hydrocarbons are subjected to contact with the catalyst to form alkylated hydrocarbons, continuously withdrawing reaction mixture from each stage, separating the withdrawn mixture into a normally gaseous hydrocarbon phase rich in isobutane, a normally liquid hydrocarbon phase containing normal paraffins and a catalyst phase, withdrawing the normally liquid hydrocarbon phase, returning the catalyst phase to the stage from which withdrawn, returning the gaseous hydrocarbon phase to the reaction for further contact with olefin hydrocarbons, discharging at least a substantial portion of said normally liquid hydrocarbon phase, and passing the remaining portion of the normally liquid hydrocarbon phase to the stage succeeding that from which it was withdrawn.

2. In a continuous process for alkylating isoparaffin hydrocarbons with olefin hydrocarbons by contact with a liquid alkylation catalyst in a reaction zone comprising a series of reaction stages wherein a portion of reaction mixture is withdrawn from a preceding stage and, in part at least, passed to a succeeding stage, the steps which comprise passing hydrocarbons comprising $C_4$ olefins and paraffins including iso and normal paraffins to said reaction stages, continuously withdrawing a stream of reacting hydrocarbons and catalyst from a preceding stage, separating catalyst from a portion of said stream, vaporizing from the resulting substantially catalyst-free portion low boiling hydrocarbons with refrigerative effect so that the vaporizing mixture is cooled, effecting heat exchange between the cooled mixture and the remaining portion of the withdrawn stream so as to cool the stream and absorb heat liberated in the reaction, returning the cooled portion of the stream to said preceding stage, returning the vaporized hydrocarbons to the alkylation zone, discharging at least a portion of the unvaporized hydrocarbons including normal paraffins and alkylated hydrocarbons from further treatment in the reaction, and passing unvaporized hydrocarbons not so discharged to a succeeding zone.

3. The method according to claim 2 in which catalyst separated from the withdrawn stream is returned, all or in part, to said preceding stage.

4. The method according to claim 2 in which isobutane and feed olefin containing normal paraffins is passed directly to each of a plurality of said stages.

5. In a continuous process for alkylating isoparaffin hydrocarbons with olefins by contact with a liquid alkylation catalyst in a zone of reaction comprising a series of reaction stages through which hydrocarbons undergoing reaction flow in succession, the steps which comprise continuously passing feed hydrocarbons comprising olefins, isobutane and normal butane to the initial stage, continuously withdrawing a stream of reacted and unreacted hydrocarbons from the initial stage, diverting at least a substantial portion of said withdrawn stream and discharging the diverted portion from further contact with the catalyst, passing the non-diverted portion to the next succeeding stage, repeating said steps of stream withdrawal and diversion between succeeding pairs of stages, commingling said streams discharged between stages, subjecting the commingled mixture to fractionation to separate therefrom a fraction comprising alkylated hydrocarbons and fractions respectively rich in isobutane and normal butane, discharging the normal butane fraction and recycling the isobutane to the alkylation reaction.

6. The process according to claim 5 in which feed olefins are passed directly to each of a plurality of said stages.

7. In a continuous process for alkylating isoparaffin hydrocarbons with olefin hydrocarbons by contact with a liquid alkylation catalyst in a zone of reaction comprising a series of reaction stages through which hydrocarbons undergoing reaction flow in succession, the steps which comprise passing paraffins and olefins comprising isobutane and normal butane to a preceding stage, withdrawing a stream of reaction mixture from said preceding stage, separating catalyst liquid from the withdrawn stream for return at least in part to the stage from which withdrawn, thereby securing a hydrocarbon mixture of reacted and unreacted hydrocarbons including isobutane, refrigeratively vaporizing low boiling hydrocarbons including isobutane from said hydrocarbon mixture, discharging at least a substantial portion of the non-vaporized portion of the hydrocarbon mixture containing normal paraffins, passing the non-discharged portion to the succeeding stage, withdrawing a separate stream of reaction mixture from said preceding stage, subjecting said separate stream to indirect heat exchange with said first mentioned stream during refrigerative evaporation thereof to effect cooling of said separate stream, returning the cooled separated stream to the stage from which withdrawn, repeating the aforesaid steps between each pair of succeeding stages and introducing additional isobutane and feed olefin containing normal paraffins to each of a plurality of said stages.

8. In a continuous process for alkylating an isoparaffin with an olefin by contact with a liquid alkylation catalyst in a reaction zone, the steps which comprise passing hydrocarbons, comprising $C_4$ olefins and paraffins including isobutane and n-butane to said reaction zone, continuously withdrawing a stream of reacting hydrocarbons and catalyst from said zone, separating catalyst from at least a portion of said withdrawn stream to provide a hydrocarbon phase, vaporizing from the resulting hydrocarbon phase low-boiling hydrocarbons comprising isobutane with refrigerative effect so that the remaining hydrocarbon liquid is cooled, effecting indirect heat exchange between cooled hydrocarbon liquid and reaction mixture of said alkylation reaction zone to absorb heat liberated in the reaction, returning vaporized low-boiling hydrocarbons comprising isobutane to said alkylation reaction zone, discharging at least a portion of the said hydrocarbon liquid thus employed for indirect heat exchange, and fractionating the said discharged hydrocarbon liquid to remove additional low-boiling hydrocarbons comprising isobutane therefrom and to recover a stabilized liquid alkylate.

9. Process according to claim 8, wherein low-boiling hydrocarbons comprising isobutane removed in the stabilization of the alkylate are commingled with low-boiling hydrocarbons comprising isobutane vaporized from the said hydrocarbon phase, and the commingled hydrocarbons are compressed and returned to the alkylation reaction zone.

10. In a continuous process for alkylating a low-boiling isoparaffin with an olefin for the production of normally liquid hydrocarbons within the gasoline boiling range, wherein the isoparaffin and olefin with the isoparaffin in substantial molar excess of the olefin are reacted in the presence of an alkylation catalyst in an alkylation reaction zone under alkylating conditions to produce the normally liquid hydrocarbons, and reaction products are continuously separated into a hydrocarbon phase and a catalyst phase, the improvement which comprises refrigeratively evaporating at least a portion of said separated hydrocarbon phase to vaporize low boiling constituents therefrom and concomitantly produce a body of chilled hydrocarbon liquid, effecting indirect heat exchange between resulting chilled hydrocarbon liquid and materials undergoing reaction in said alkylation reaction zone to absorb heat liberated in the reaction, and then recovering a stablized liquid alkylate from at least a portion of the chilled hydrocarbon liquid thus employed in the indirect heat exchange step.

11. Process according to claim 10, wherein a stream of reaction products of said alkylation reaction zone is continuously recirculated through a closed circuit, and the chilled hydrocarbon liquid is brought into indirect heat exchange with said stream of recirculated reaction products.

12. Process according to claim 10, wherein vaporized low-boiling constituents removed from the separated hydrocarbon phase in said evaporation step are compressed and returned to the said alkylation reaction zone.

13. Process according to claim 10, in which the catalyst is strong sulfuric acid of alkylation strength, and the hydrocarbon reactants comprise isobutane and a $C_4$ olefin.

ARTHUR R. GOLDSBY.
JOHN C. VAN GUNDY.